United States Patent Office 2,700,656
Patented Jan. 25, 1955

2,700,656

PLASTICIZED POLYVINYL CHLORIDE COMPOSITIONS

William S. Emerson and Raymond I. Longley, Jr., Dayton, Ohio, assignors to Monsanto Chemical Company, St. Louis, Mo., a corporation of Delaware No Drawing. Application March 27, 1950,
Serial No. 152,258

13 Claims. (Cl. 260—31.6)

This invention relates to new plastic compositions comprising polyvinyl chloride and a diester of a substituted 1,5-pentanediol or mixtures thereof.

Compositions based on polyvinyl chloride are among the most widely used plastic materials currently available. Polyvinyl chloride per se however is a hard, horny, brittle material which has little utility. This material is modified by the incorporation of a plasticizer to provide a large range of compositions of varying physical properties.

Vinyl chloride may be copolymerized with other monomers, as for example a small amount of vinyl acetate to also materially improve the general physical properties of the vinyl chloride resin. Copolymers of this nature, wherein the vinyl chloride is the major resin constituent, may also be further modified by the incorporation of a plasticizer. Thus, by "vinyl chloride" resin is meant polyvinyl chloride and copolymers of vinyl chloride wherein the vinyl chloride comprises at least about 80 per cent by weight of the resin composition.

Many plasticizers have been recommended and are used for formulation with vinyl chloride resins. However, for various reasons none of the plasticizers available provides the optimum conditions for all physical properties. Currently the most widely used general polyvinyl chloride plasticizers are tricresyl phosphate and di-2-ethylhexyl phthalate.

The object of this invention is to provide plasticized vinyl chloride compositions wherein the plasticizer is compatible with the vinyl chloride composition over a wide range of proportions, is effective over a wide range of temperature variations, and exhibits a low volatility; and the plasticized composition exhibits good heat stability, low water soluble loss and water absorption, good color, and satisfactory milling characteristics. Other objects will be apparent from the following disclosure.

It has now been found that compositions of polyvinyl chloride with compounds of the formula:

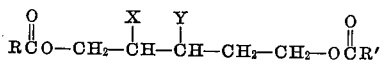

wherein R and R' are selected from the group consisting of alkyl radicals containing from 7 to 11 carbon atoms, inclusive, and aromatic radicals containing from 6 to 9 carbon atoms, inclusive; Y is selected from the group H and CH$_3$; X is selected from the group H, CH$_3$ and C$_2$H$_5$. and at least one of the group X and Y is an alkyl radical; provide resins which have chemical and physical characteristics which are comparable or superior to the best general plasticizers currently employed. The interaction products may thus be produced from substituted 1,5-pentanediols, as for example, 2-methyl-1,5-pentanediol, 2 - ethyl - 1,5 - pentanediol and 3 - methyl 1,5-pentanediol; with aliphatic monocarboxylic acids containing from 8 to 12 carbon atoms, as for example, caprylic, pelargonic, capric, undecylic, lauric, 2-ethylhexoic and other homologous acids; aromatic monocarboxylic acids containing from 7 to 10 carbon atoms, as for example, benzoic, toluic, dimethylbenzoic, ethylbenzoic, phenylacetic, β-phenylpropionic and other homologous acids; and mixtures thereof by general esterification reaction procedures.

It is not essential that the mixed esters be produced from equimolecular quantities of aliphatic and aromatic monocarboxylic acids, but various ratios can be employed, as for example 0 to 100 mole per cent aromatic monocarboxylic acid and 100 to 0 mole per cent aliphatic monocarboxylic acid, such that the diester product is the esterification product of one mole of a substituted 1,5-pentanediol with the sum of about two moles of the aforementioned monocarboxylic acids. However, to assure compatibility and low volatility, preferably at least about 25 mole per cent of the R and R' radicals should be selected from the group consisting of the aromatic radicals.

The diester plasticizer, as above identified, can be employed from about 5 up to about 45 per cent by weight of the final composition and preferably from about 20 to 45 per cent. Mixed plasticizers can also be employed from the above group and other suitable prior art plasticizers can be employed with the plasticizers of this invention.

The polyvinyl chloride composition also may contain a stabilizer to protect the resin from thermal decomposition and degradation of color, fillers, coloring materials, and mold lubricants, as are well-known to those familiar with the art.

The following examples are illustrative of this invention:

Example 1

130 g. (1.06 moles) benzoic acid
59 g. (0.5 mole) 3-methyl-1,5-pentanediol
45 ml. benzene The above materials, were placed in a 1000 ml. flask equipped with a reflux condenser through a Dean and Stark distilling receiver and heated at reflux for 17 hours. The reaction mixture was cooled, diluted with hexane and 70 g. of caustic solution containing 10 g. of sodium hydroxide was added thereto with stirring to neutralize any residual benzoic acid. Then the two liquid phases were allowed to separate and the aqueous phase removed. After additional water-washing of the reaction mixture it was fractionally distilled and 137 g. of product recovered at 174° C. and 0.1 mm. of mercury. The yield was 94.5 per cent of 3-methyl-1,5-pentanediol dibenzoate.

Calculated for C$_{20}$H$_{22}$O$_4$: C, 73.6; H, 6.7. Found: C, 73.9; H, 6.7.

Example 2

122 g. (1 mole) benzoic acid
172 g. (1 mole) capric acid
118 g. (1 mole) 3-methyl-1,5-pentanediol
50 ml. benzene The above materials were reacted and treated in a similar manner to Example 1 and 334 g. (89 per cent yield) of 3-methyl-1,5-pentanediol benzoate-caprate mixture boiling between 178 and 192° C. at about 0.25 mm. of mercury was obtained.

Example 3

70 g. (0.51 mole) toluic acids
90 g. (0.52 mole) capric acid
59 g. (0.5 mole) 3-methyl-1,5-pentanediol
45 ml. benzene The above materials were reacted at reflux for 5 hours and treated in a similar manner to Example 1 and 138 g. (71 per cent yield) of 3-methyl-1,5-pentanediol toluate-caprate mixture boiling between 184 and 192° C. at 0.2 mm. of mercury was obtained.

Example 4

The products of Examples 1, 2 and 3 were milled into a standard polyvinyl chloride composition in an amount sufficient to provide 40 per cent plasticizer on the basis of the total composition, that is 40 per cent plasticizer and 60 per cent vinyl chloride resin, and evaluated as shown in the table.

|  | TCP | DOP | Ex. 1 | Ex. 2 | Ex. 3 |
|---|---|---|---|---|---|
| Low Temp. Flexibility,[1] °C | −10 | −36 | −20 | −50 | −50 |
| Shore Durometer Hardness "A" | 78 | 74 | 65 | 68 | 68 |
| Percent Volatility 24 hrs. at 105° C | 0.8 | 4.5 | 2.2 | 1.6 | 1.2 |
| Percent Water Absorption 24 hrs | 0.32 | 0.14 | 0.36 | 0.30 | 0.29 |
| Percent Water Leaching Loss 24 hrs | 0.01 | 0.02 | 0 | 0 | 0.01 |

TCP = tricresyl phosphate.
DOP = di-2-ethylhexyl phthalate.
Ex. 1 = 3-methyl-1,5-pentanediol dibenzoate.
Ex. 2 = 3-methyl-1,5-pentanediol benzoate-caprate.
Ex. 3 = 3-methyl-1,5-pentanediol toluate-caprate.
[1] Clash and Berg method.

The plasticizers of Examples 1, 2 and 3 above did not exhibit any disgreeable fuming during the milling operation, and the molded composition was clear and had good heat stability.

Other suitable plasticizers of this type which may be compounded with vinyl chloride resins are for example:

3-methyl-1,5-pentanediol benzoate-carprylate,
3-methyl-1,5-pentanediol toluate-laurate,
3-methyl-1,5-pentanediol toluate-2-ethylhexoate,
2-methyl-1,5-pentanediol toluate-caprylate, and
2-ethyl-1,5-pentanediol benzoate-laurate.

The diester plasticizer compositions of this invention are described and claimed in the co-pending application of William S. Emerson and Raymond I. Longley, Jr., Serial No. 152,274, filed March 27, 1950.

We claim:

1. A plasticized vinyl chloride resin which comprises a polymer of vinyl chloride containing intimately dispersed therein a diester compound having the formula

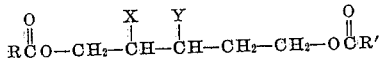

wherein R and R′ are selected from the group consisting of alkyl radicals containing from 7 to 11 carbon atoms, inclusive, and aromatic radicals containing from 6 to 9 carbon atoms, inclusive; Y is selected from the group consisting of H and $CH_3$; X is selected from the group consisting of H, $CH_3$ and $C_2H_5$; and at least one of the group X and Y is an alkyl radical.

2. The plasticized vinyl chloride resin composition of claim 1 wherein the diester comprises from about 20 to about 45 per cent by weight of the total composition.

3. The plasticized vinyl chloride resin composition of claim 8 wherein the acids are employed in about equimolecular amounts.

4. The plasticized vinyl chloride resin composition of claim 9 wherein the acids are employed in about equimolecular amounts.

5. The plasticized vinyl chloride resin composition of claim 10 wherein the acids are employed in about equimolecular amounts.

6. The plasticized vinyl chloride resin composition of claim 11 wherein the acids are employed in about equimolecular amounts.

7. A plasticized vinyl chloride resin which comprises a polymer of vinyl chloride containing intimately dispersed therein from about 20 to about 45 per cent, by weight of the total composition, 3-methyl-1,5-pentanediol dibenzoate.

8. A plasticized vinyl chloride resin which comprises a polymer of vinyl chloride containing intimately dispersed therein from about 20 to about 45 per cent, by weight of the total composition, of the material prepared by esterifying (a) one mole of 3-methyl-1,5-pentanediol with (b) from about 0.5 to 2 moles of benzoic acid and (c) up to 1.5 moles of capric acid, such that the sum of the said acids is about 2 moles.

9. A plasticized vinyl chloride resin which comprises a polymer of vinyl chloride containing intimately dispersed therein from about 20 to about 45 per cent, by weight of the total composition, of the material prepared by esterifying (a) one mole of 3-methyl-1,5-pentanediol with (b) from about 0.5 to 2 moles of benzoic acid and (c) up to 1.5 moles of lauric acid, such that the sum of the said acids is about 2 moles.

10. A plasticized vinyl chloride resin which comprises a polymer of vinyl chloride containing intimately dispersed therein from about 20 to about 45 per cent, by weight of the total composition, of the material prepared by esterifying (a) one mole of 3-methyl-1,5-pentanediol with (b) from about 0.5 to 2 moles of toluic acid and (c) up to 1.5 moles of capric acid, such that the sum of the said acids is about 2 moles.

11. A plasticized vinyl chloride resin which comprises a polymer of vinyl chloride containing intimately dispersed therein from about 20 to about 45 per cent, by weight of the total composition, of the material prepared by esterifying (a) one mole of 3-methyl-1,5-pentanediol with (b) from about 0.5 to 2 moles of toluic acid and (c) up to 1.5 moles of lauric acid, such that the sum of the said acids is about 2 moles.

12. A vinyl chloride resin plasticized with 3-methyl-1,5-pentanediol dibenzoate.

13. A vinyl chloride resin plasticized with 3-methyl-1,5-pentanediol dicaprate.

No references cited.